(12) United States Patent  
Kawashima et al.

(10) Patent No.: US 8,068,736 B2  
(45) Date of Patent: Nov. 29, 2011

(54) TUNABLE DISPERSION COMPENSATOR

(75) Inventors: Hiroshi Kawashima, Tokyo (JP); Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 886 days.

(21) Appl. No.: 12/042,823

(22) Filed: Mar. 5, 2008

(65) Prior Publication Data

US 2008/0240727 A1 Oct. 2, 2008

(30) Foreign Application Priority Data

Mar. 28, 2007 (JP) .................. 2007-083534  
Feb. 29, 2008 (JP) .................. 2008-050718

(51) Int. Cl.  
*H04J 14/02* (2006.01)
(52) U.S. Cl. ........................................ 398/81
(58) Field of Classification Search ............... 398/81  
See application file for complete search history.

(56) References Cited

U.S. PATENT DOCUMENTS

| 6,421,482 B1 * | 7/2002 | Augustsson ............... 385/48 |
| 6,721,092 B2 * | 4/2004 | Aozasa et al. ............. 359/341.5 |
| 2005/0058397 A1 | 3/2005 | Doerr |
| 2005/0058398 A1 | 3/2005 | Doerr |
| 2011/0085761 A1 | 4/2011 | Nara et al. |

FOREIGN PATENT DOCUMENTS

JP 2005-92217 4/2005

OTHER PUBLICATIONS

U.S. Appl. No. 12/041,231, filed Mar. 3, 2008, Hasegawa, et al.  
U.S. Appl. No. 12/056,892, filed Mar. 27, 2008, Nara.  
U.S. Appl. No. 13/015,218, filed Jan. 27, 2011, Nara.  
C. R. Doerr, et al., "Four-Stage Mach-Zehnder-Type Tunable Optical Dispersion Compensator With Single-Knob Control", IEEE Photonics Technology Letters, vol. 17, No. 12, Dec. 2005, pp. 2637-2639.

* cited by examiner

*Primary Examiner* — Shi K Li  
(74) *Attorney, Agent, or Firm* — Oblon, Spivak, McClelland, Maier & Neustadt, L.L.P.

(57) ABSTRACT

The tunable dispersion compensator 10 of the present invention comprises: the Mach-Zehnder interferometers (MZIs) 21 to 25 cascaded on a planar lightwave circuit; and the tunable couplers 31 to 34 connected to between each corresponding pair of the MZIs respectively. The Y-branch waveguide 15 and 16 are used for connecting to between the MZIs 21, 25 as both end sides and the input/output optical waveguides 13, 14 respectively. The waveguide loop mirror 40 is connected to the final stage MZI 25 among the MZIs 21 to 25 which an incident light is propagated last therethrough. The half-wave plate 50 is inserted to the loop waveguide 41 of the waveguide loop mirror 40. And it becomes able to enhance (double) the amount of tunable dispersion because an input light signal is passed twice through the similar path by the waveguide loop mirror 40.

12 Claims, 9 Drawing Sheets

(A)

(B)

(C)

(A)

(B)

(C)

(D)

(E)

(F)

(A)

(B)

(C)

(A)

(B)

(C)

(A)

(B)

(C)

TUNABLE DISPERSION COMPENSATOR

BACKGROUND OF THE INVENTION

1. Technical Field

The present invention relates to a tunable dispersion compensator using a plurality of Mach-Zehnder interferometers cascaded on a planar lightwave circuit.

2. Related Arts

So far, there are following two technologies for example as methods for dissolving a polarization dependency regarding a double-pass planar lightwave circuit type tunable dispersion compensator (TDC) using a plurality of Mach-Zehnder interferometers (MZIs) cascaded on a planar lightwave circuit (PLC).

1. In a published Japanese patent application No. 2005-092217 (hereinafter, it is described as a document 1), there is disclosed a technology for dissolving the polarization dependency by arranging a half-wave plate with crossing each middle point of two arms of a middle positioned MZI of cascaded three MZIs.

2. In a document by C. R. Doerr et. al, IEEE Photonics Technology Letters, Vol. 17, No. 12, December 2005, pp. 2637-2639 (hereinafter, it is described as a document 2), there is disclosed a technology for dissolving the polarization dependency by arranging a reflection mirror on one end facet of a PLC chip in which four MZIs are formed, and by inserting a quarter-wave plate between the one end facet and the reflection mirror.

According to the conventional technology of the above mentioned document 1, however, there are problems that a total manufacturing cost becomes increased because a loss on a reflection surface of the mirror is increased and a high accuracy of mounting the mirror is required, when a double-pass is obtained with being reflected by the mirror arranged on the one end facet of the PLC chip for enhancing an amount of dispersion.

On the contrary, according to the conventional technology of the above mentioned document 2, it is possible to rotate a polarization by using the quarter-wave plate at the same time of reflecting by the reflection mirror, however, there are problems that a loss on the reflection surface of the reflection mirror is large, and the loss on the reflection surface becomes increased due to a small displacement of an angle on the one end facet of the PLC chip.

BRIEF SUMMARY OF THE INVENTION

The present invention is presented with having regard to the above mentioned conventional problems, and has an object is to provide a tunable dispersion compensator for being possible to realize an enhancement of the amount of tunable dispersion, with a low loss and a low manufacturing cost.

In a tunable dispersion compensator according to a first aspect of the present invention, which comprises: a plurality of Mach-Zehnder interferometers cascaded on a planar lightwave circuit; a tunable coupler connected to between any pair of a plurality of the Mach-Zehnder interferometers; and a waveguide loop mirror connected to a final stage Mach-Zehnder interferometer among a plurality of the Mach-Zehnder interferometers which an incident light is propagated last therethrough, a tunable dispersion property is obtained by changing a coupling efficiency of the tunable coupler.

According to the aspect, the light propagated through the cascaded Mach-Zehnder interferometers (MZIs) and through the tunable couplers connected to between every MZI respectively is returned to the final stage MZI after propagating through a loop waveguide of the waveguide loop mirror because the waveguide loop mirror is connected to a final stage MZI among a plurality of the cascaded MZIs, and is output after propagating through the cascaded MZIs and through every tunable coupler. That is to say, the incident light is output after passing twice through the cascaded MZIs. Thus, it is able to enhance (double) the amount of tunable dispersion by being the light passed twice through the similar path as a double-pass, with using the waveguide loop mirror.

Moreover, it is able to manufacture the planar lightwave circuit (PLC) type tunable dispersion compensator (TDC) with a low cost, and a loss by the waveguide loop mirror is low, because it is able to form the waveguide loop mirror on the similar PLC where a plurality of the MZIs cascaded thereon.

Therefore, it becomes possible to realize an enhancement of the amount of tunable dispersion, with the low loss and the low manufacturing cost.

In a tunable dispersion compensator according to a second aspect of the present invention, the waveguide loop mirror comprises a 3 dB coupler having two input ports and two output ports and a loop waveguide which the two output ports of the 3 dB coupler are loop connected thereto, and one input port of the two input ports of the 3 dB coupler which is to be a cross path for a light propagating toward either one direction through the loop waveguide is connected to the final stage Mach-Zehnder interferometer.

According to the aspect, an incident light input from an input port is bisected by the 3 dB coupler in the waveguide loop mirror, and one of the bisected light propagates either one direction through the loop waveguide (in a clockwise direction for example) after passing through a through path of the 3 dB coupler, meanwhile, another one of the bisected light propagates another direction (in a counterclockwise direction for example) after passing through a cross path of the 3 dB coupler. Here, a phase difference between the propagating lights for both directions becomes to be zero, because the lights propagating through the paths in the clockwise and the counterclockwise directions pass through the similar loop waveguide. Therefore, it is able to improve the enhancement of the amount of tunable dispersion with the low loss, because the waveguide loop mirror functions as a mirror, as every light (both of the clockwise direction light and the counterclockwise direction light) is output to another input port which is to be the cross path for the light propagating toward either one direction through the loop waveguide for such the 3 dB coupler.

In a tunable dispersion compensator according to a third aspect of the present invention, which further comprises: a Y-branch waveguide; and a first input/output optical waveguide, wherein the final stage Mach-Zehnder interferometer is connected by the Y-branch waveguide to either one end of the first input/output optical waveguide, and the one input port of the 3 dB coupler is connected to another end of the first input/output optical waveguide.

In a tunable dispersion compensator according to a fourth aspect of the present invention, which further comprises a second input/output optical waveguide connected by a Y-branch waveguide to a first stage Mach-Zehnder interferometer among a plurality of the Mach-Zehnder interferometers which an incident light is propagated first therethrough, an optical circulator is connected to an end of the second input/output optical waveguide via a single mode fiber.

In a tunable dispersion compensator according to a fifth aspect of the present invention, the tunable coupler connected to between any pair of a plurality of the Mach-Zehnder interferometers comprises a Mach-Zehnder interferometer in which thin film heaters are formed on every delay line having a phase difference of π or zero.

In a tunable dispersion compensator according to a sixth aspect of the present invention, each of a plurality of the Mach-Zehnder interferometers comprises one pair of delay lines having a predetermined optical path difference respectively, and a half-wave plate is inserted into a central part of at least one of the one pair of delay lines for any one of a plurality of the Mach-Zehnder interferometers.

According to the aspect, it is able to reduce the polarization dependency because of performing an alternation of polarization, that is to say, the alternation of a transverse electric (TE) polarized light and a transverse magnetic (TM) polarized light, using the half-wave plate inserted into the central part of any one or more of the delay lines for a plurality of the MZIs.

In a tunable dispersion compensator according to a seventh aspect of the present invention, each of a plurality of the Mach-Zehnder interferometers comprises one pair of delay lines having a predetermined optical path difference respectively, and a half-wave plate is inserted into the central part of the one pair of delay lines for all of a plurality of the Mach-Zehnder interferometers respectively.

According to the aspect, it is able to further reduce the polarization dependency because of performing the alternation of polarization at each of the delay lines for all of the MZIs respectively.

In a tunable dispersion compensator according to an eighth aspect of the present invention, the waveguide loop mirror comprises a 3 dB coupler of two input ports and two output ports and a loop waveguide which the two output ports of the 3 dB coupler are loop connected thereto, and one of the two input ports of the 3 dB coupler which is to be a cross path for a light propagating toward either one direction through the loop waveguide is connected to the final stage Mach-Zehnder interferometer.

In a tunable dispersion compensator according to a ninth aspect of the present invention, which further comprises: a Y-branch waveguide; and a first input/output optical waveguide, wherein the final stage Mach-Zehnder interferometer is connected by the Y-branch waveguide to either one end of the first input/output optical waveguide, and one of the two input ports of the 3 dB coupler is connected to another end of the first input/output optical waveguide.

In a tunable dispersion compensator according to a tenth aspect of the present invention, which further comprises a second input/output optical waveguide connected by a Y-branch waveguide to a first stage Mach-Zehnder interferometer among a plurality of the MZIs which an incident light is propagated first therethrough, wherein an optical circulator is connected to an end of the second input/output optical waveguide via a single mode fiber.

In a tunable dispersion compensator according to an eleventh aspect of the present invention, the tunable coupler connected to between any pair of a plurality of the Mach-Zehnder interferometers comprises a Mach-Zehnder interferometer in which thin film heaters are formed on every delay line having a phase difference of π or zero.

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION OF THE INVENTION

Every embodiment embodied the present invention will be described in detail below, based on the drawings. Here, duplicated description is omitted with using a similar symbol for the similar component part.

The First Embodiment

A planar lightwave circuit type tunable dispersion compensator (PLC type TDC) 10 according to the first embodiment of the present invention will be described in detail below, based on FIG. 1 to FIG. 4 and FIG. 6.

Figure 1:
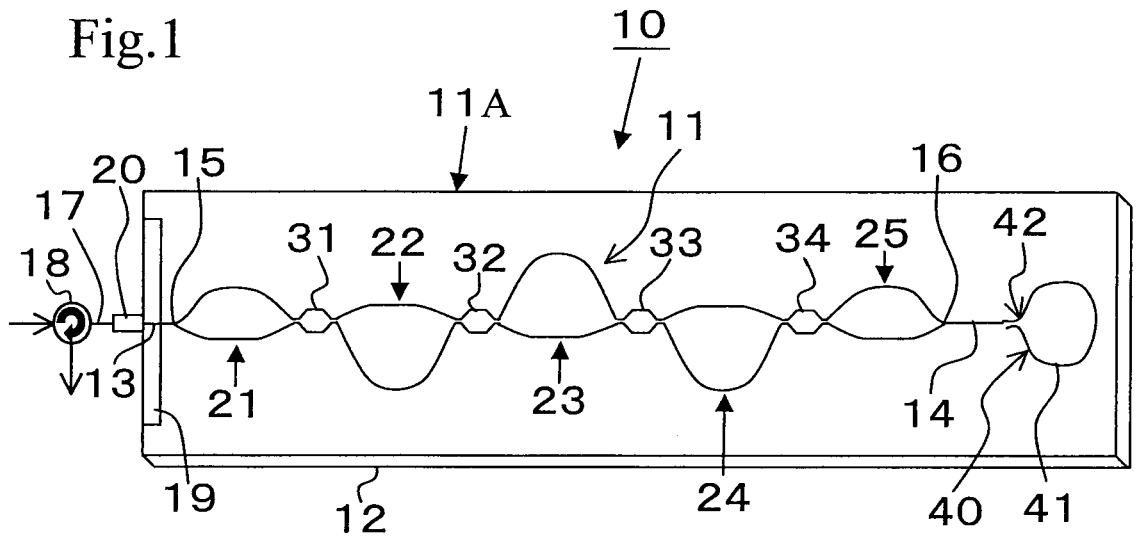
FIG. 1 is a diagrammatic perspective view showing a brief configuration of tunable dispersion compensator according to the first embodiment of the present invention.

As shown in FIG. 1, the PLC type TDC 10 comprises a plurality of PLC type Mach-Zehnder interferometers (MZIs) 21 to 25 cascaded on a planar lightwave circuit (PLC) 11 and tunable couplers 31 to 34 connected to between each corresponding pair of the MZIs respectively, for being able to obtain a tunable property by changing a coupling efficiency of each tunable coupler.

The PLC 11 is, for example, a silica based PLC in which a silica glass optical waveguide is formed using an optical fiber manufacturing technology combined with a semiconductor fine processing technology on a PLC substrate 12, such as a silicon substrate or the like.

The MZIs 21 to 25 have a configuration of a five-stage connected MZI as five MZIs are cascade connected therebetween. Each of the MZIs 21 to 25 comprises two delay lines (waveguides) having a predetermined optical path difference respectively. That is to say, the optical path difference PS1 of the MZI 21 is defined as $\Delta L$, the optical path difference PS2 of the MZI 22 is defined as $2\Delta L$, the optical path difference PS3 of the MZI 23 is defined as $2\Delta L$, the optical path difference PS4 of the MZI 24 is defined as $2\Delta L$, and the optical path difference PS5 of the MZI 25 is defined as $\Delta L$. Moreover, the tunable couplers 31, 32, 33 and 34 are connected to between the MZI 21 and the MZI 22, the MZI 22 and the MZI 23, the MZI 23 and the MZI 24, the MZI 24 and the MZI 25 respectively. Each of the tunable couplers 31 to 34 comprises two delay lines (waveguides) having an optical path difference of $\pi$ and thin film heaters (not shown) formed on the delay lines.

Moreover, Y-branch waveguides 15 and 16 are used for connecting to between the MZI 21, 25 as both end sides of the cascaded MZIs 21 to 25 and input/output optical waveguides 13, 14 respectively. That is to say, the first stage MZI 21 among the cascaded MZIs 21 to 25 through which an incident light propagates first is connected to the input/output optical waveguide 13 (the second input/output optical waveguide) via the Y-branch waveguide 15, meanwhile, the final stage MZI 25 among the cascaded MZIs 21 to 25 through which the incident light propagates last is connected to the input/output optical waveguide 14 (the first input/output optical waveguide) via the Y-branch waveguide 16.

Furthermore, an optical circulator 18 is connected to an end of the input/output optical waveguide 13 via a single mode fiber 17, for inputting/outputting an light signal from/to the end of the input/output optical waveguide 13.

The aspects of such the PLC type TDC 10 will be described as below configurations.

A loop mirror 40 is connected to the final stage MZI 25 among the cascaded MZIs which the incident light is propagated last, for enhancing (doubling) the amount of tunable dispersion by double-passing.

Moreover, the symbol 19 means a glass plate for reinforcing, and the symbol 20 means a fiber array, in FIG. 1.

Figure 2:
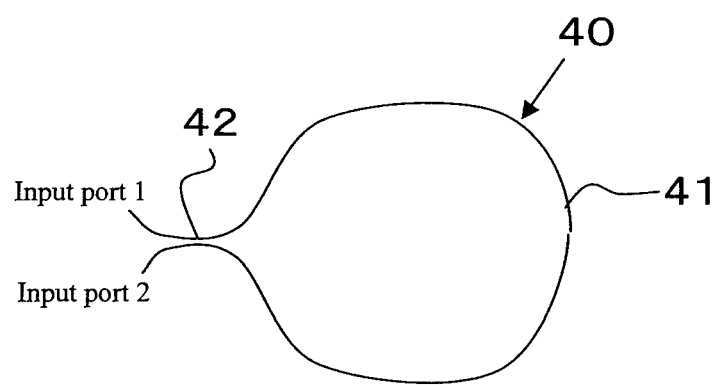
FIG. 2 is a enlarged view of a waveguide loop mirror.

Furthermore, the waveguide loop mirror 40 has a configuration in which two output ports of a 3 dB coupler 42 of two input ports by two output ports type (a 50% directional coupler) are loop connected as shown in FIG. 2. That is to say, the waveguide loop mirror 40 comprises: the 3 dB coupler 42 comprising two input ports 1, 2, and two output ports 3, 4; and a loop waveguide 41 which the two output ports 3 and 4 of such the 3 dB coupler are loop connected thereto, as shown in FIG. 2 and FIG. 3.

Figure 3:
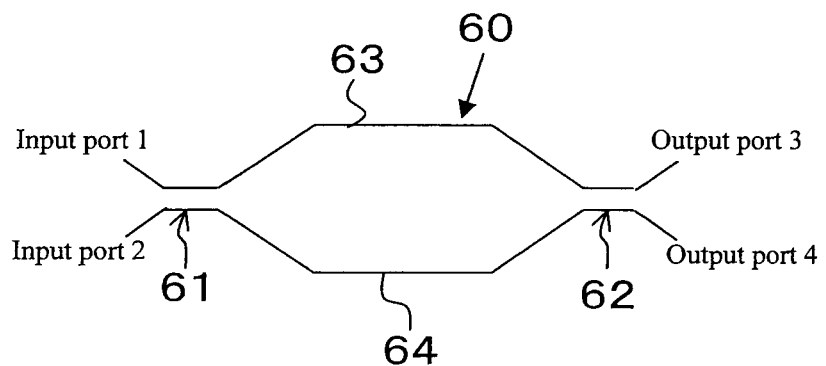
FIG. 3 is a plan view showing an MZI of 2 by 2 type used for description of functions regarding the waveguide loop mirror.

Here, a basic configuration of the PLC type TDC 10 using the cascaded PLC type MZIs is similar to an example shown in FIG. 3 according to the document 2, however, the number of stages is to be five regarding the present embodiment, and a free spectral range (FSR) for each of the end stage MZIs 21 and 25 is to be 100 GHz, and the FSR for each of the middle three MZIs 22 to 24 is to be 50 GHz, respectively.

A function of such the waveguide loop mirror 40 is able to be described with using an ordinary MZI 60 of two by two type shown in FIG. 3. Regarding the MZI 60 as shown in FIG. 3, at the time of being a coupling efficiency between the two couplers (3 dB couplers) 61 and 62 defined as 50% and being a phase difference between two arm waveguides 63 and 64 between the couplers 61 and 62 defined as $\Delta\phi$, a coupling efficiency $\eta$ for a light output from the input port 1 to the output port 4 is generally expressed as $$\eta=\cos^2(\Delta\phi/2)$$ (equation 1).

Therefore, the $\eta$ becomes one ($\eta=1$: 100% binding) at the time of being the phase difference $\Delta\phi$ zero ($\Delta\phi=0$), hence all of the lights input from the input port 1 are to be output to the output port 4.

Meanwhile, a light input from the input port 1 is bisected by the 3 dB coupler 42 in the waveguide loop mirror 40 shown in FIG. 2, and one of the bisected light propagates in a clockwise direction for example through the loop waveguide 41 after passing through a through path of the 3 dB coupler 42, meanwhile, another one of the bisected light propagates in a counterclockwise direction for example after passing through a cross path of the 3 dB coupler 42. Here, the phase difference between the propagating lights for both directions becomes to be zero, because the lights propagating through the paths in the clockwise and the counterclockwise directions pass through the similar loop waveguide 41. Hence, the clockwise direction light and the counterclockwise direction light enter again the 3 dB coupler 42 after propagating through the loop waveguide 41 have a same phase state, as similar to that the lights enter the second coupler (the 3 dB coupler) 62 after propagating through a upper side arm waveguide 63 and a lower side arm waveguide 64 shown in FIG. 3. Thus, the waveguide loop mirror 40 functions as a mirror, because every light (both of the clockwise direction light and the counterclockwise direction light) is output to the input port 1 for the 3 dB coupler 42 shown in FIG. 2 which is to be the cross path for the clockwise direction light, as similar to that every light is output to the output port 4 for the second coupler 62 shown in FIG. 3 which is to be the cross path for lights propagating through the upper side arm waveguide 63.

Therefore, the input port 1 is connected to an end of the input/output optical waveguide 14 regarding the present embodiment, as the one input port of the two input ports 1 and 2 of the 3 dB coupler 42 in the waveguide loop mirror 40 which is to be a cross path for the clockwise direction light propagating through the loop waveguide 41.

In such the PLC type TDC 10 having the above mentioned configuration, a light signal input from the end of the input/output optical waveguide 13 propagates through the MZIs 21 to 25 and through the tunable couplers 31 to 34, next it is input into the 3 dB coupler 42 from the input port 1 of the 3 dB coupler 42, next it propagates through the loop waveguide 41 in the clockwise or the counterclockwise direction via the 3 dB coupler 42, and it is output to the input port 1 via the 3 dB coupler 42. Moreover, the light signal output to the input port 1 is to be output from the input/output optical waveguide 13 after propagating once again through the MZIs 21 to 25 and through the tunable couplers 31 to 34. That is to say, the input light signal is output after passing twice through the cascaded MZIs 21 to 25 and the tunable couplers 31 to 34. Thus, according to the PLC type TDC 10, it is able to enhance (double) the amount of tunable dispersion by being the light signal passed twice through the similar path as the double-pass, with using the waveguide loop mirror 40.

Next, manufacturing processes of the PLC type TDC 10 having the above mentioned configuration will be described in detail below, based on FIG. 4.

Figure 4:
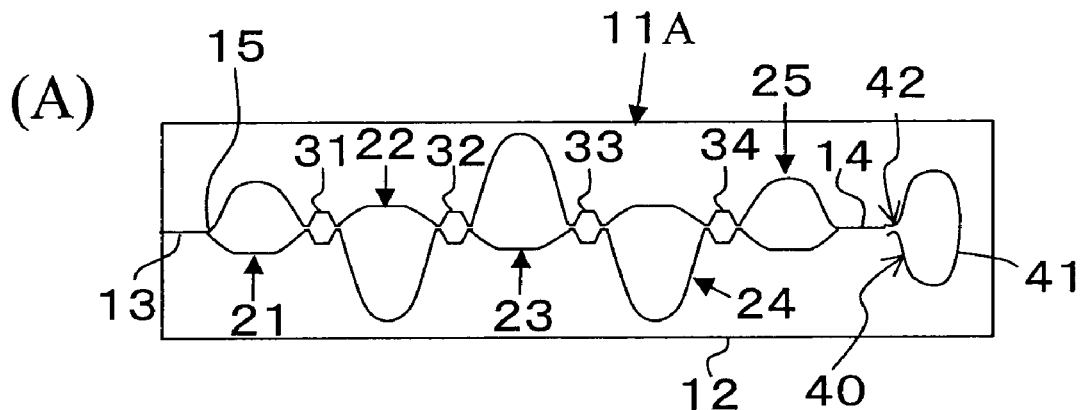
FIGS. 4 (A), (B) and (C) are process flow diagrams showing manufacturing processes of a tunable dispersion compensator according to the first embodiment of the present invention.
Figure 4:
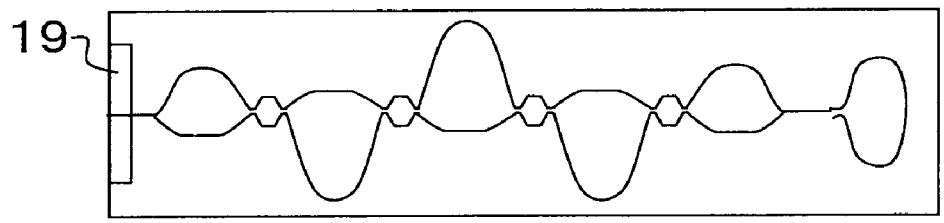
Figure 4:
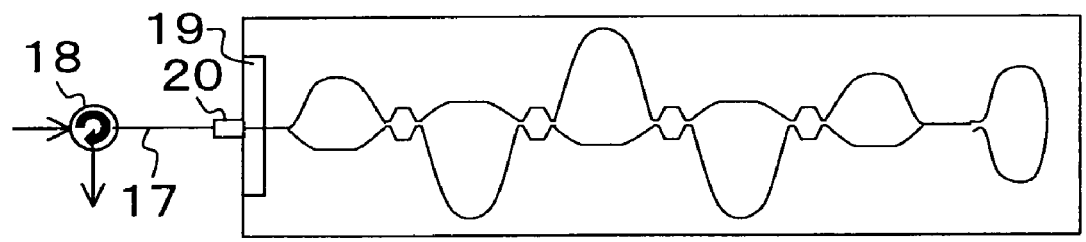

FIG. 4 (A) to (C) are process flow diagrams showing manufacturing processes of the PLC type TDC 10 according to the present embodiment.

First, a PLC chip 11A is manufactured, which comprises the cascaded MZIs 21 to 25, the tunable couplers 31 to 34, and the waveguide loop mirror 40 connected thereto (refer to FIG. 4 (A)).

Next, an end facet for fiber connection of the PLC chip 11A with the glass plate for reinforcing 19 is polished as diagonally eight degrees approximately for preventing from reflection and return lights, after bonding and fixing the glass plate for reinforcing 19 onto an end facet side for fiber connection of the PLC substrate 12 (refer to FIG. 4 (B)).

Next, an alignment is performed between the fiber array 20 and the PLC chip 11A via the optical circulator 18, and the fiber array 20 is bonded and fixed to the end facet for fiber connection of the PLC chip 11A (refer to FIG. 4 (C)).

Next, manufacturing processes of a PLC type TDC having a conventional configuration will be described below as a comparison example using FIG. 5 (A) to (F). Here, the PLC type TDC to be described comprises the five-stage connected MZIs cascade connecting five MZIs therebetween, as similar to the present embodiment, and a configuration that a quarter-wave plate is added onto a mirror of end facet attaching type using such as the above mentioned conventional technology.

Figure 5:
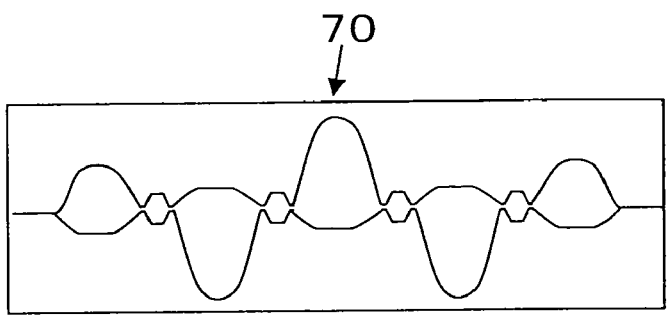
FIG. 5 (A) to (F) are process flow diagrams showing manufacturing processes of a comparison example.
Figure 5:
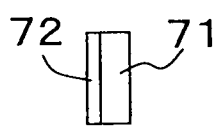
Figure 5:
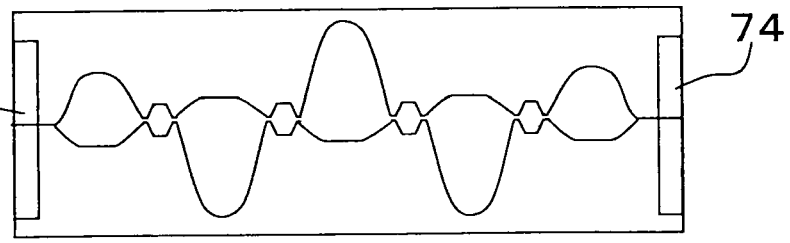
Figure 5:
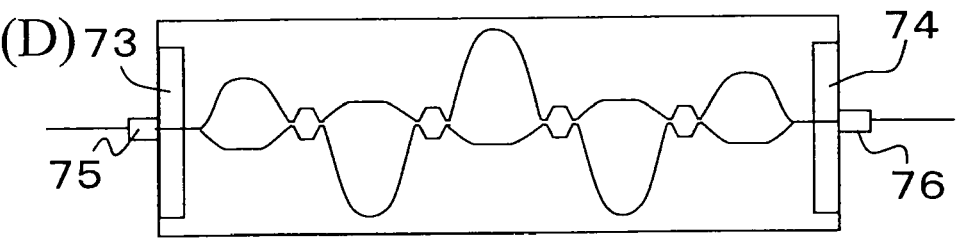
Figure 5:
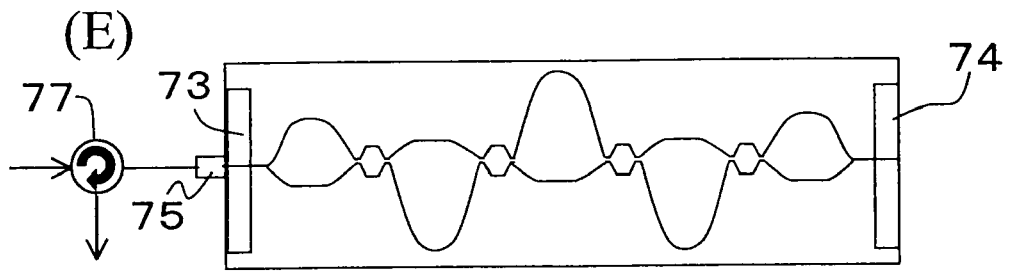
Figure 5:
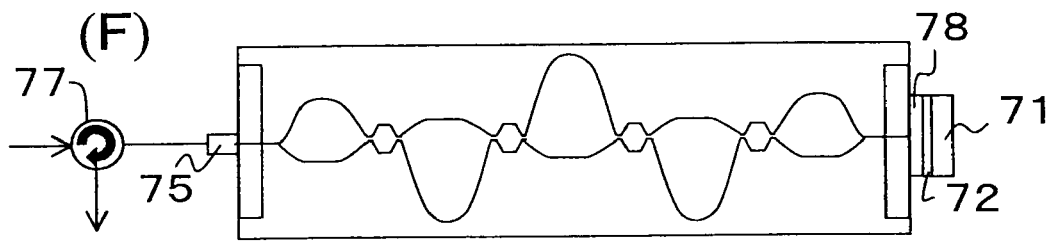

First, a PLC chip 70 is formed, which comprises the cascaded MZIs 21 to 25 and the tunable couplers 31 to 34 without the waveguide loop mirror 40 (refer to FIG. 5 (A)).

Next, a reflection mirror 72 is formed on an end facet of a block 71 made of such as a glass or the like (refer to FIG. 5 (B)).

Next, an end facet for fiber connection of the PLC chip 11A with a glass plate for reinforcing 73 is polished as diagonally eight degrees approximately and an end facet for mirror attaching of a glass plate for reinforcing 74 is vertically polished respectively, after bonding and fixing the glass plates for reinforcing 73 and 74 onto an end facet side for fiber connection and an end facet side for mirror attaching of the PLC chip 70 respectively (refer to FIG. 5 (C)).

Next, a fiber array 75 having a diagonal end facet is arranged for the end facet for fiber connection and a fiber array 76 having a vertical end facet is arranged for the end facet for mirror attaching respectively, and an alignment is performed therefor. Moreover, only the fiber array 75 having the diagonal end facet is bonded and fixed, meanwhile, the fiber array 76 having the vertical end facet is removed (refer to FIG. 5 (D)).

Next, an optical circulator 77 is connected to the fiber array 75 having the diagonal end facet (refer to FIG. 5 (E)).

Next, the reflection mirror 72 is bonded to the end facet for mirror attaching of the PLC chip 70, via a quarter-wave plate 78 (refer to FIG. 5 (F)).

Regarding the PLC type TDC 10 according to the present embodiment, as comparing FIG. 4 to FIG. 5, it is obvious that it has advantages on process simplification that the polishing process for end facet is required only for one end facet side because the reflection mirror is not necessary, and that it becomes unnecessary to connect temporary the fiber array having the vertical end facet to the end facet for mirror attaching, which is required in the conventional configuration.

Figure 6:
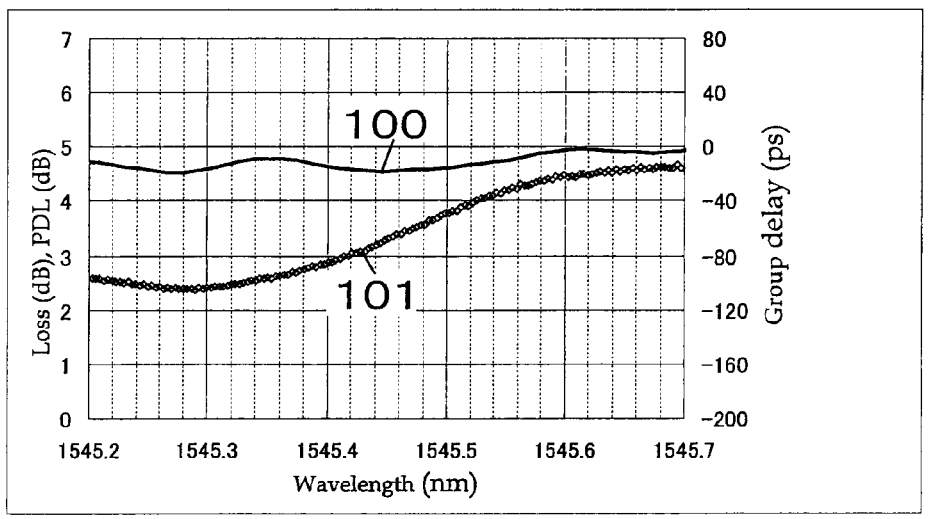
FIGS. 6 (A), (B) and (C) are graphs showing spectra of a tunable dispersion compensator according to the first embodiment of the present invention: showing a polarization mean transmission loss and a group delay spectrum at the time of setting an amount of dispersion as +300 ps/nm, zero dispersion, and −300 ps/nm respectively.
Figure 6:
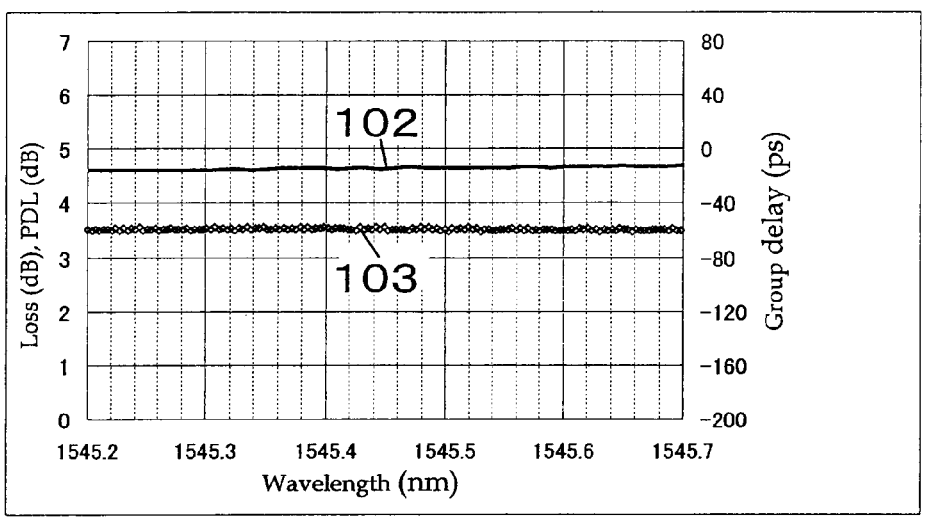
Figure 6:
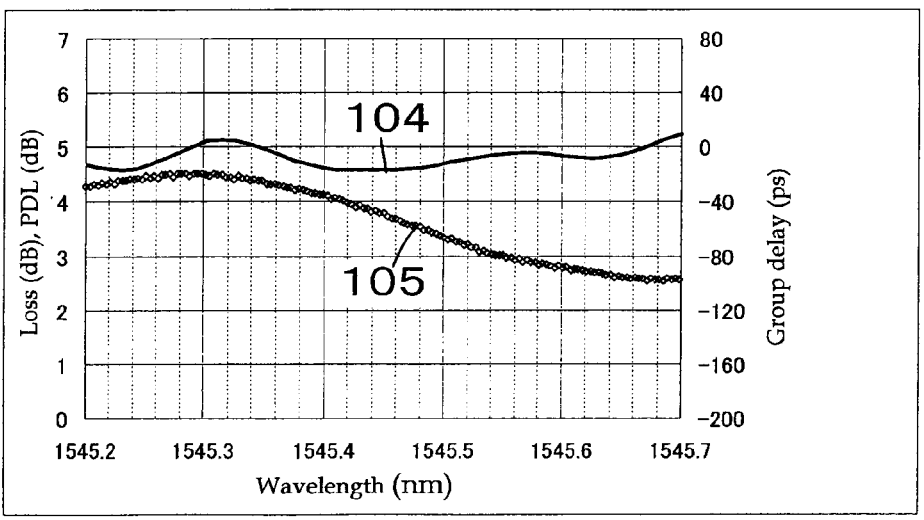

Next, spectra of the actually manufactured PLC type TDC 10 according to the present embodiment are shown in FIG. 6 (A) to (C). Moreover, spectra of a PLC type TDC as a comparison example are shown in FIG. 7 (A) to (C), which is manufactured with applying a configuration that a quarter-wave plate and a reflection mirror are bonded onto end facets respectively thereof.

In FIG. 6 (A), a polarization mean transmission loss is shown as a curved line 100 and a group delay spectrum is shown as a curved line 101 respectively, at the time of setting an amount of dispersion as +300 ps/nm. In FIG. 6 (B), the polarization mean transmission loss is shown as a curved line 102 and the group delay spectrum is shown as a curved line 103 respectively, at the time of setting the amount of dispersion as zero dispersion (0 ps/nm). And in FIG. 6 (C), the polarization mean transmission loss is shown as a curved line 104 and the group delay spectrum is shown as a curved line 105 respectively, at the time of setting the amount of dispersion as −300 ps/nm.

Figure 7:
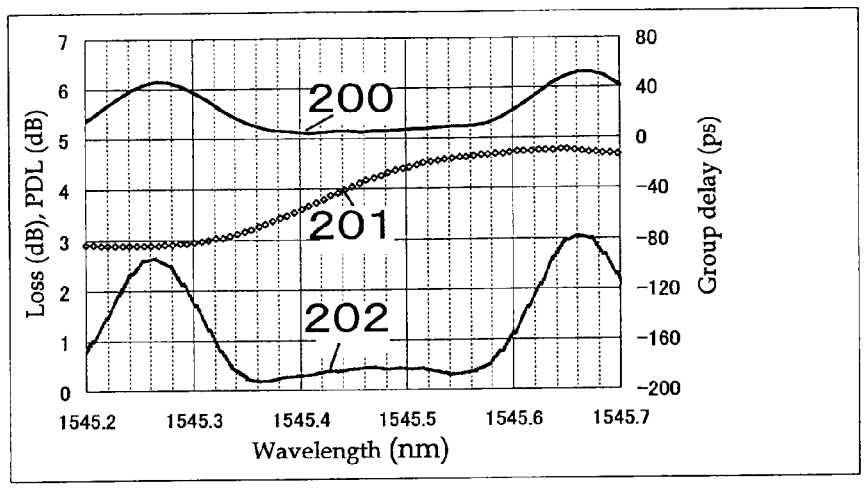
FIGS. 7 (A), (B) and (C) are graphs showing spectra of a comparison example: showing a polarization mean transmission loss, a group delay spectrum and a polarization dependent loss (PDL) at the time of setting an amount of dispersion as +300 ps/nm, zero dispersion, and −300 ps/nm respectively.
Figure 7:
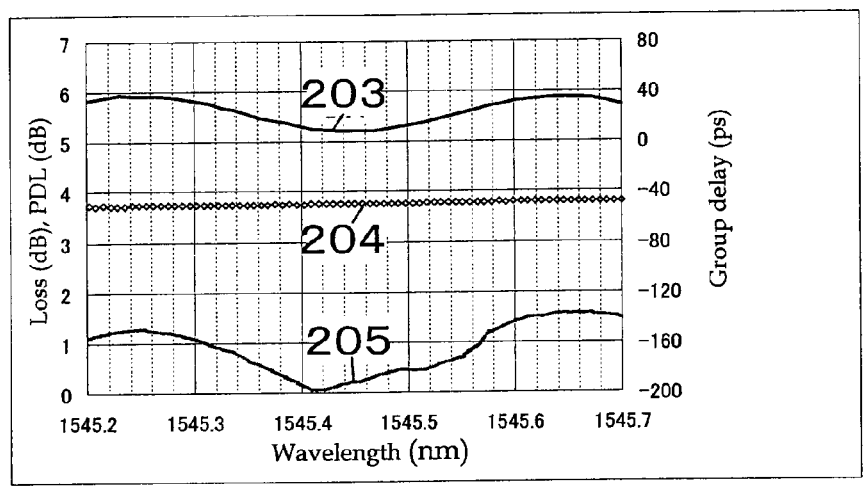
Figure 7:
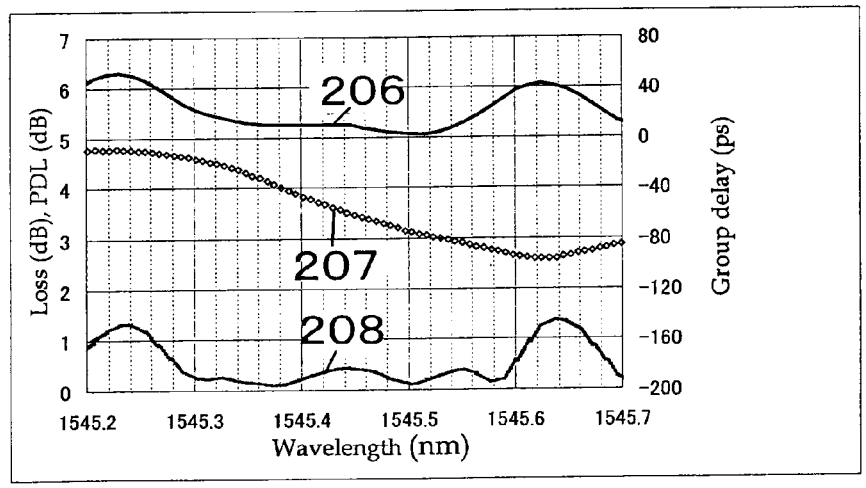

Moreover, in FIG. 7 (A), the polarization mean transmission loss is shown as a curved line 200, the group delay spectrum is shown as a curved line 201, and a polarization dependent loss (PDL) is shown as a curved line 202 respectively, at the time of setting the amount of dispersion as +300 ps/nm. In FIG. 7 (B), the polarization mean transmission loss is shown as a curved line 203, the group delay spectrum is shown as a curved line 204, and the PDL is shown as a curved line 205 respectively, at the time of setting the amount of dispersion as zero dispersion (0 ps/nm). And in FIG. 7 (C), the polarization mean transmission loss is shown as a curved line 206, the group delay spectrum is shown as a curved line 207, and the PDL is shown as a curved line 208 respectively, at the time of setting the amount of dispersion as −300 ps/nm.

First, it is able to be confirmed that an inclination of the group delay is able to be tunable in a passband of between approximately 1545.35 nm and 1545.55 nm by each of the group delay spectrums shown in FIG. 6 (A) to (C) respectively, and it is obvious that it functions as a TDC. Moreover, it is able to be confirmed that the loss (the polarization mean transmission loss) of the PLC type TDC 10 of the present embodiment shown in FIG. 6 is approximately 0.55 dB lower than that of the comparison example shown in FIG. 7 in such the passband of therebetween, by comparing the loss spectra (the spectra of the polarization mean transmission loss) in FIG. 6 with that in FIG. 7 respectively, and it is obvious that the PLC type TDC 10 of the present embodiment is able to be manufactured with having the loss lower than that of the comparison example manufactured using the conventional technology.

That is to say, a loss at a reflecting part regarding the comparison example is 0.80 dB approximately. On the contrary, the loss regarding the present embodiment is able to be estimated as within:

A propagation loss in the waveguide loop mirror 40
=0.10 dB approximately,
A loss in the 3 dB coupler 42=
=0.15 dB approximately,
In total=0.25 dB approximately.

According to the first embodiment including the above mentioned structure, the following functions and advantages are able to be obtained.

A light signal input from the end of the input/output optical waveguide 13 is to be output after passing twice through the cascaded MZIs 21 to 25, because the waveguide loop mirror 40 is connected to the final stage MZI 25 among the cascaded MZIs 21 to 25 which the incident light is propagated last therethrough. Thus, it is able to enhance (double) the amount of tunable dispersion by being the input light signal passed twice through the similar path as the double-pass, with using the waveguide loop mirror 40.

According to the reflection by the mirror of end facet attaching type using the above mentioned conventional technology, the loss of approximately 0.80 dB is occurred at the reflecting part due to a scattering loss by the mirror and a radiation loss at the attaching part. On the contrary, according to the configuration regarding the present embodiment using the waveguide loop mirror 40, it becomes possible to realize the low loss because the total loss is able to be suppressed as approximately 0.25 dB in total added with the loss of approximately 0.15 dB in the 3 dB coupler 42 and with the propagation loss of approximately 0.10 dB in the loop waveguide 41.

It becomes possible to realize an enhancement of the amount of tunable dispersion, with the low loss and the low manufacturing cost.

The Second Embodiment

A planar lightwave circuit (PLC) type tunable dispersion compensator (TDC) 10B according to the second embodiment of the present invention will be described in detail below, based on FIG. 8.

Figure 8:
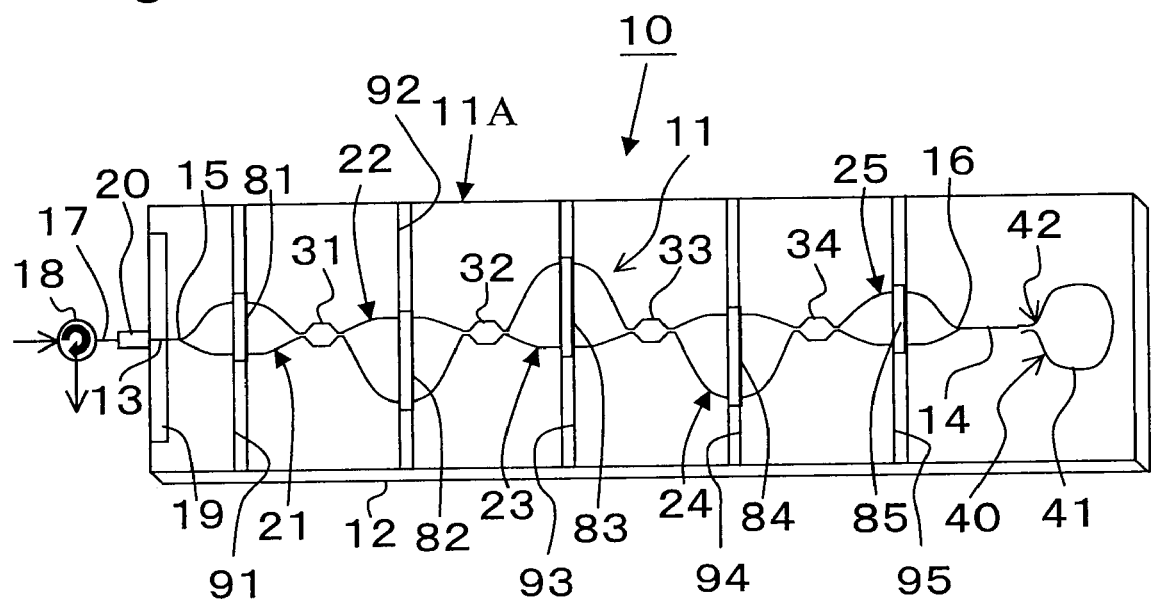
FIG. 8 is a diagrammatic perspective view showing a brief configuration of a tunable dispersion compensator according to the second embodiment of the present invention.

Regarding the PLC type TDC 10B, half-wave plates 81 to 85 are inserted into central parts of the delay lines for all of the MZIs 21 to 25 respectively, as shown in FIG. 8. Moreover, slits 91 to 95 for wavelength plate insertion are formed by dicing on the central parts of the delay lines for all of the MZIs 21 to 25 respectively. Furthermore, the half-wave plates 81 to 85 are inserted into the slits 91 to 95 respectively, and every connecting part is bonded and fixed therebetween.

Next, manufacturing processes of the PLC type TDC 10B according to the second embodiment shown in FIG. 8 will be described in detail below, based on FIG. 9.

Figure 9:
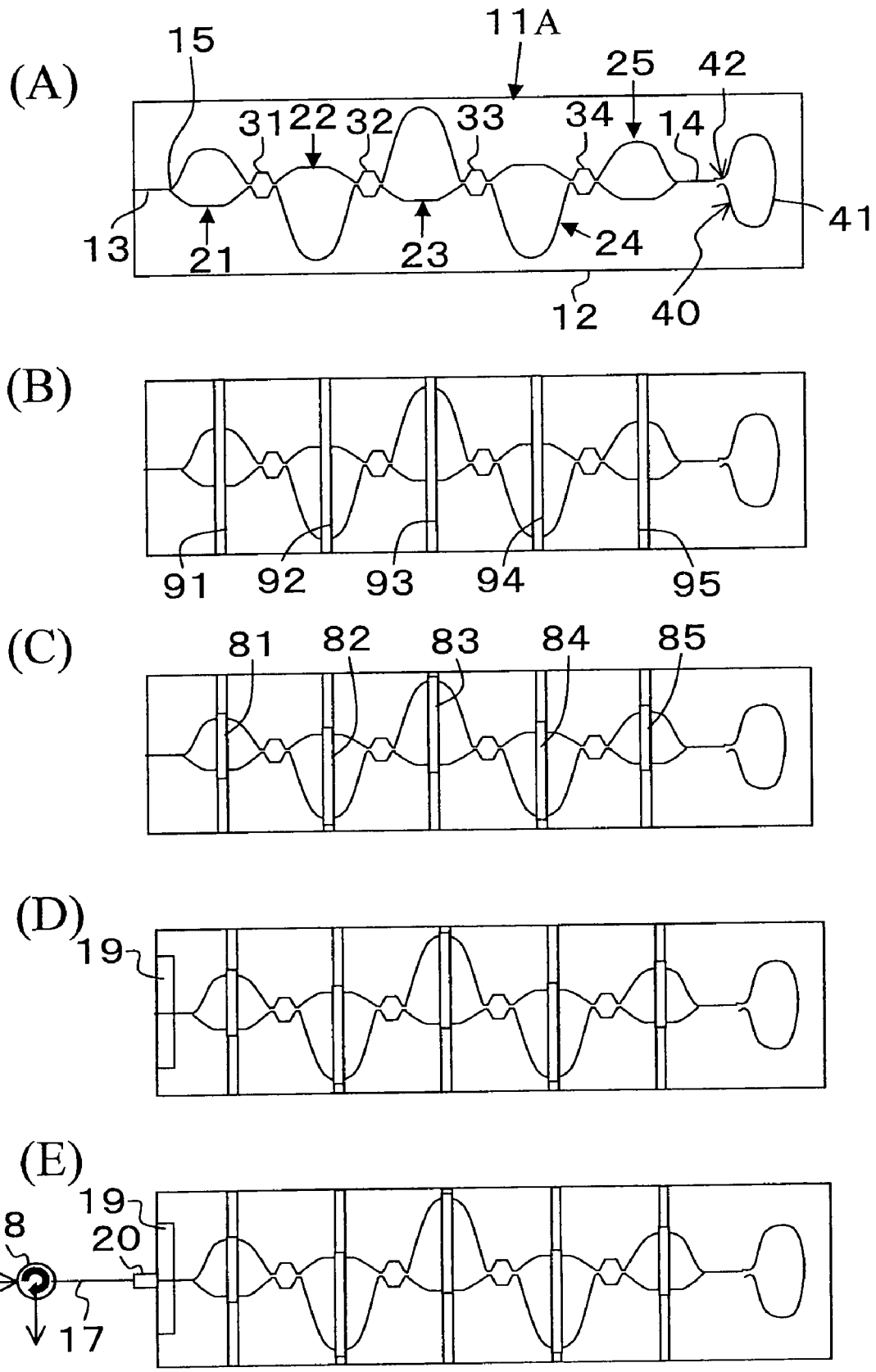
FIG. 9 (A) to (E) are process flow diagrams showing manufacturing processes of a tunable dispersion compensator according to the second embodiment of the present invention.

FIG. 9 (A) to (E) are process flow diagrams showing manufacturing processes of the PLC type TDC 10B.

First, the PLC chip 11A is manufactured, which comprises the cascaded MZIs 21 to 25, the tunable couplers 31 to 34, and the waveguide loop mirror 40 connected thereto (refer to FIG. 9 (A)).

Next, the slits 91 to 95 for wavelength plate insertion are formed by dicing at the central parts of the delay lines for all of the MZIs 21 to 25 respectively (refer to FIG. 9 (B)).

Next, the half-wave plates 81 to 85 are inserted into the slits 91 to 95 respectively, and every connecting part is bonded and fixed therebetween (refer to FIG. 9 (C)).

Next, an end facet for fiber connection of the PLC chip 11A with the glass plate for reinforcing 19 is polished as diagonally eight degrees approximately for preventing from reflection and return lights, after bonding and fixing the glass plate for reinforcing 19 onto an end facet side for fiber connection of the PLC substrate 12 (refer to FIG. 9 (D)).

Next, an alignment is performed between the fiber array 20 and the PLC chip 11A via the optical circulator 18, and the fiber array 20 is bonded and fixed to the end facet for fiber connection of the PLC chip 11A with the glass plate for reinforcing 19 (refer to FIG. 9 (E)).

Figure 10:
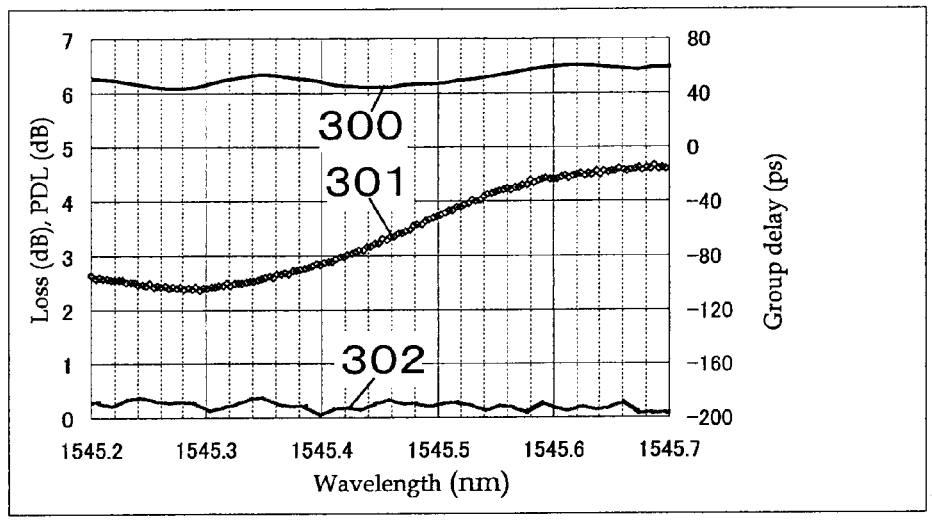
FIGS. 10 (A), (B) and (C) are graphs showing spectra of a tunable dispersion compensator according to the second embodiment of the present invention: showing a polarization mean transmission loss, a group delay spectrum and a polarization dependent loss (PDL) at the time of setting an amount of dispersion as +300 ps/nm, zero dispersion, and −300 ps/nm respectively.
Figure 10:
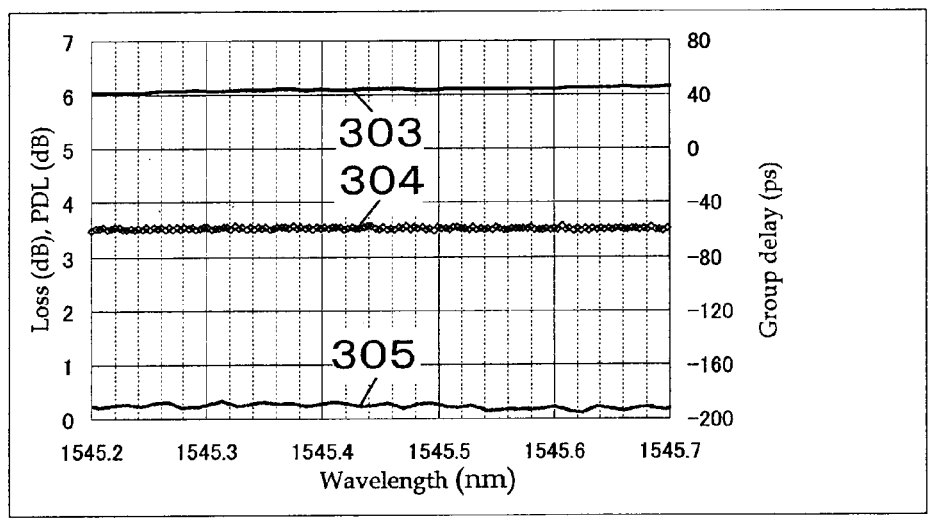
Figure 10:
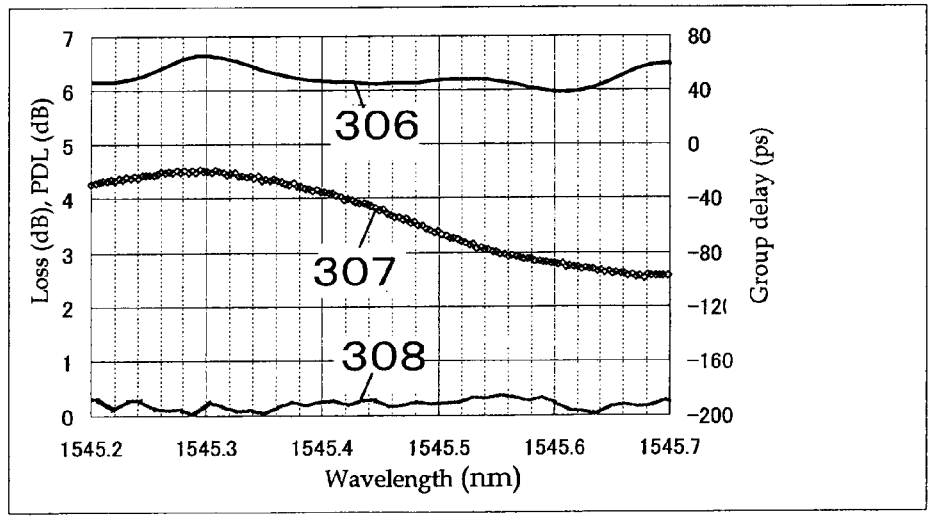

Next, spectra of the actually manufactured PLC type TDC 10B according to the second embodiment are shown in FIG. 10 (A) to (C). Meanwhile, the spectra of the PLC type TDC as the comparison example are shown in FIG. 7 (A) to (C), which is manufactured with applying the configuration that the quarter-wave plate and the reflection mirror are bonded onto the end facets respectively thereof.

In FIG. 10 (A), a polarization mean transmission loss is shown as a curved line 300, a group delay spectrum is shown as a curved line 301, and a polarization dependent loss (PDL) is shown as a curved line 302 respectively, at the time of setting an amount of dispersion as +300 ps/nm. In FIG. 10 (B), the polarization mean transmission loss is shown as a curved line 303, the group delay spectrum is shown as a curved line 304, and the PDL is shown as a curved line 305 respectively, at the time of setting the amount of dispersion as zero dispersion (0 ps/nm). And in FIG. 10 (C), the polarization mean transmission loss is shown as a curved line 306, the group delay spectrum is shown as a curved line 307, and the PDL is shown as a curved line 308 respectively, at the time of setting the amount of dispersion as −300 ps/nm.

First, it is able to be confirmed that an inclination of the group delay is able to be tunable in a passband of between approximately 1545.35 nm and 1545.55 nm by each of the group delay spectrums shown in FIG. 10 (A) to (C) respectively, and it is obvious that it functions as a TDC. Moreover, it is able to be confirmed that an almost complete polarization independency is obtained as not more than 0.50 dB approximately in such the passband of therebetween, by the PDL spectra shown in FIG. 10 (A) to (C) respectively.

The following results are obtained by comparing the present embodiment shown in FIG. 10 (A) to (C) with the comparison example shown in FIG. 7 (A) to (C).

According to the present embodiment, the loss is increased as approximately 0.95 dB more than that of the comparison example, however, the maximum PDL within the passband is improved approximately 0.45 dB from that of the comparison example, as to approximately 0.30 dB from approximately 0.75 dB.

Regarding the loss at a reflecting part, it is approximately 0.80 dB according to the comparison example.

On the contrary, the loss is occurred regarding the present embodiment as:
A propagation loss in the waveguide loop mirror 40
=0.10 dB approximately,
A loss in the 3 dB coupler 42
=0.15 dB approximately,
A loss at the wavelength plate slits
=0.15 dB×5 (stages)×2 (double-pass) approximately,
=1.50 dB approximately,
In total=1.75 dB approximately.

Regarding the PDL, conventionally an alternation of polarization is performed only at the end facets thereof. On the contrary, in the PLC type TDC 10B according to the present embodiment, it is able to perform an polarization compensation more certainly than that for the conventional type, because of performing the alternation of polarization at each of the half-wave plates 81 to 85 inserted into the central parts of the delay lines for all of the MZIs 21 to 25 respectively.

According to the second embodiment including the above mentioned structure, the following functions and advantages are able to be obtained, in addition to the functions and advantages obtained by the above described first embodiment.

It becomes able to reduce the polarization dependency, and becomes possible to perform the polarization compensation more certainly than that for the conventional type, because of performing the alternation of polarization, that is to say, the alternation of the TE polarized light and the TM polarized light, using each of the half-wave plates 81 to 85 inserted into the central parts of the delay lines for all of the MZIs 21 to 25 respectively.

The Third Embodiment

A planar lightwave circuit (PLC) type tunable dispersion compensator (TDC) 10C according to the third embodiment of the present invention will be described in detail below, based on FIG. 11.

Figure 11:
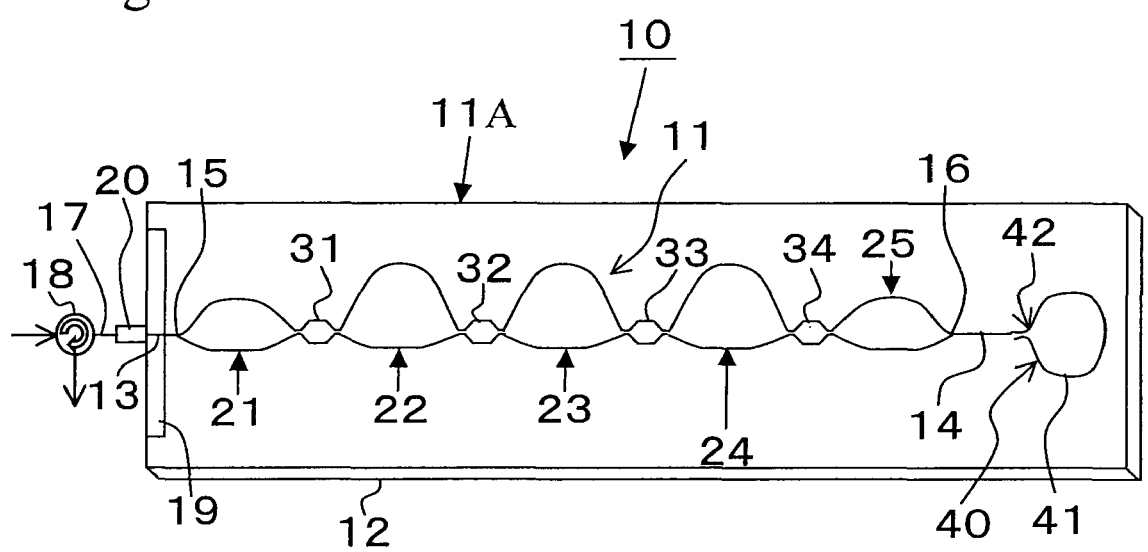
FIG. 11 is a diagrammatic perspective view showing a brief configuration of a tunable dispersion compensator according to the third embodiment of the present invention.

The PLC type TDC 10C comprises a plurality of PLC type Mach-Zehnder interferometers (MZIs) 21 to 25 cascaded on a planar lightwave circuit (PLC) 11 and tunable couplers 31 to 34 connected to between each corresponding pair of the MZIs respectively, for being able to obtain a tunable property by changing a coupling efficiency of each tunable coupler, as shown in FIG. 11. The PLC type TDC 10C according to the third embodiment has almost the similar configuration to that of the PLC type TDC 10 according to the first embodiment, however, the phase difference among the MZIs connected to each of the tunable couplers 31 to 34 is to be zero in the TDC 10C. That is to say, the coupling efficiency of the couplers becomes a 100% at the period of an initial state in the TDC 10C using (equation 1) expressed in the first embodiment, comparing to that being a zero % at the period of the initial state in the TDC 10 because of the phase difference π among the MZIs connected to each of the tunable couplers 31 to 34 according to the above mentioned first embodiment. Therefore, in the PLC type TDC 10C according to the third embodiment, every longer delay line among the MZIs 21 to 25 is arranged in a similar direction corresponding to a light propagation direction respectively (for example, a upper side in FIG. 11), for being a light propagation state at the period of the initial state as similar to that of the above mentioned first embodiment.

According to the third embodiment including the above mentioned structure, the similar functions and advantages obtained by the above described first embodiment are able to be obtained as well.

Moreover, the present invention is also able to be embodied with modifying as follows.

According to each of the above mentioned embodiments, the PLC type TDC 10, 10B and 10C are described, with using the five-stage connected MZIs that five PLC type MZIs 21 to 25 are cascade connected therebetween, as the cascaded MZIs on the PLC 11. However, the present invention is not limited thereto; for example, the present invention is also applicable to a PLC type TDC with using a three-stage connected MZIs that three PLC type MZIs are cascade connected therebetween.

The present invention is widely applicable to a PLC type TDC, which comprises: cascaded MZIs on a planar lightwave circuit; and a tunable coupler connected to between any pair of the MZIs, wherein a tunable property is obtained by changing a coupling efficiency of the tunable coupler.

According to the above mentioned second embodiment, the half-wave plates 81 to 85 are inserted into the central parts of the delay lines for all of the MZIs 21 to 25 respectively, as shown in FIG. 8. However, the present invention is not limited thereto; as the present invention is also applicable to a PLC type TDC comprising a half-wave plate inserted into the central part of any one or more of the delay lines for a plurality of the MZIs. For example, it is applicable to a PLC type TDC comprising the half-wave plate inserted into the central part of the delay line of only the MZI 23 as the middle among the MZIs 21 to 25 regarding the above mentioned second embodiment.

It is also available to reduce the polarization dependency by inserting the half-wave plate into the central part of the loop waveguide 41 of the waveguide loop mirror 40, instead of inserting the half-wave plates 81 to 85 into the central parts of the delay lines for all of the MZIs 21 to 25 regarding the above mentioned second embodiment.

The present invention is not limited to the above described embodiments and various; further modifications may be possible without departing from the scope of the present invention.

This application is based on the published Japanese patent application No. 2007-83534 filed on Mar. 28, 2007 and the published Japanese patent application No. 2008-50718 filed on Feb. 29, 2008, entire content of which is expressly incorporated by reference herein.

What is claimed is:

1. A tunable dispersion compensator comprising:
   a plurality of Mach-Zehnder interferometers cascaded on a planar lightwave circuit (PLC);
   a tunable coupler connected to between any pair of a plurality of the Mach-Zehnder interferometers; and
   a waveguide loop mirror connected to a final stage Mach-Zehnder interferometer among a plurality of the Mach-Zehnder interferometers through which an incident light is propagated, wherein
   a tunable dispersion property is obtained by changing a coupling efficiency of the tunable coupler,
   the PLC is a silica-based PLC in which a silica-glass optical waveguide is formed on a silicon substrate,
   the waveguide loop mirror is formed on a same substrate as that of the plurality of the Mach-Zehnder interferometers,
   the plurality of the Mach-Zehnder interferometers includes five Mach-Zehnder interferometers,
   each of a plurality of the Mach-Zehnder interferometers includes two waveguides having a predetermined optical path difference, and
   the optical path difference of the Mach-Zehnder interferometers at a first stage and the final stage is $\Delta L$, and the optical path difference of the other three Mach-Zehnder interferometers is $2\Delta L$.

2. The tunable dispersion compensator according to claim 1,
   wherein the waveguide loop mirror comprises a 3 dB coupler having two input ports and two output ports and a loop waveguide which the two output ports of the 3 dB coupler are loop connected thereto, and
   one input port of the two input ports of the 3 dB coupler which is to be a cross path for a light propagating toward either one direction through the loop waveguide is connected to the final stage Mach-Zehnder interferometer.

3. The tunable dispersion compensator according to claim 2, further comprising:
   a Y-branch waveguide; and
   a first input/output optical waveguide,
   wherein the final stage Mach-Zehnder interferometer is connected by the Y-branch waveguide to either one end of the first input/output optical waveguide, and the one input port of the 3 dB coupler is connected to another end of the first input/output optical waveguide.

4. The tunable dispersion compensator according to claim 3, further comprising:
   a second input/output optical waveguide connected by a Y-branch waveguide to a first stage Mach-Zehnder interferometer among a plurality of the Mach-Zehnder interferometers which an incident light is propagated first therethrough,
   an optical circulator is connected to an end of the second input/output optical waveguide via a single mode fiber.

5. The tunable dispersion compensator according to claim 1,
   wherein the tunable coupler connected to between any pair of a plurality of the Mach-Zehnder interferometers comprises a Mach-Zehnder interferometer in which thin film heaters are formed on every delay line having a phase difference of π or zero.

6. The tunable dispersion compensator according to claim 1,
   wherein each of a plurality of the Mach-Zehnder interferometers comprises one pair of delay lines having a predetermined optical path difference respectively, and a half-wave plate is inserted into a central part of at least one of the one pair of delay lines for any one of a plurality of the Mach-Zehnder interferometers.

7. The tunable dispersion compensator according to claim 1,
   wherein each of a plurality of the Mach-Zehnder interferometers comprises one pair of delay lines having a predetermined optical path difference respectively, and a half-wave plate is inserted into the central part of the one pair of delay lines for all of a plurality of the Mach-Zehnder interferometers respectively.

8. The tunable dispersion compensator according to claim 6,
   wherein the waveguide loop mirror comprises a 3 dB coupler of two input ports and two output ports and a loop waveguide which the two output ports of the 3 dB coupler are loop connected thereto, and
   one of the two input ports of the 3 dB coupler which is to be a cross path for a light propagating toward either one direction through the loop waveguide is connected to the final stage Mach-Zehnder interferometer.

9. The tunable dispersion compensator according to claim 8, further comprising:
   a Y-branch waveguide; and
   a first input/output optical waveguide,
   wherein the final stage Mach-Zehnder interferometer is connected by the Y-branch waveguide to either one end of the first input/output optical waveguide, and one of the two input ports of the 3 dB coupler is connected to another end of the first input/output optical waveguide.

10. The tunable dispersion compensator according to claim 9, further comprising:
    a second input/output optical waveguide connected by a Y-branch waveguide to a first stage Mach-Zehnder interferometer among a plurality of the MZIs which an incident light is propagated first therethrough,
    wherein an optical circulator is connected to an end of the second input/output optical waveguide via a single mode fiber.

11. The tunable dispersion compensator according to claim 6,
    wherein the tunable coupler connected to between any pair of a plurality of the Mach-Zehnder interferometers comprises a Mach-Zehnder interferometer in which thin film heaters are formed on every delay line having a phase difference of $\pi$ or zero.

12. The tunable dispersion compensator according to claim 7,
    wherein the tunable coupler connected to between any pair of a plurality of the Mach-Zehnder interferometers comprises a Mach-Zehnder interferometer in which thin film heaters are formed on every delay line having a phase difference of $\pi$ or zero.

* * * * *